United States Patent
Qian (10) Patent No.: US 12,110,918 B2
(45) Date of Patent: Oct. 8, 2024

(54) MOTOR CASE ASSEMBLY

(71) Applicant: ASIA VITAL COMPONENTS (CHINA) CO., LTD., Shenzhen (CN)

(72) Inventor: Jin Qian, Shenzhen (CN)

(73) Assignee: ASIA VITAL COMPONENTS (CHINA) CO., LTD., Shenzhen (CN)

( * ) Notice: Subject to any disclaimer, the term of this patent is extended or adjusted under 35 U.S.C. 154(b) by 516 days.

(21) Appl. No.: 17/575,599

(22) Filed: Jan. 13, 2022

(65) Prior Publication Data

US 2023/0220866 A1    Jul. 13, 2023

(51) Int. Cl.
*F04D 29/42*    (2006.01)
*F16B 21/18*    (2006.01)

(52) U.S. Cl.
CPC ........ *F16B 21/186* (2013.01); *F04D 29/4226* (2013.01)

(58) Field of Classification Search
CPC .. F04D 29/4226; F04D 29/4253; F04D 29/40; F04D 29/42; H05K 7/20172; F16B 2200/40; F16B 2200/406
USPC ............................ 415/201, 203, 213.1, 216.1
See application file for complete search history.

(56) References Cited

U.S. PATENT DOCUMENTS

| | | | | |
|---|---|---|---|---|
| 5,573,383 A * | 11/1996 | Uemura | ................ | F04D 29/626 417/423.15 |
| 8,072,101 B2 * | 12/2011 | Ho | ..................... | F04D 25/0613 310/90 |
| 10,138,895 B2 * | 11/2018 | Cheng | ................. | F04D 29/4226 |
| 10,557,476 B2 * | 2/2020 | Chen | ..................... | F04D 29/386 |
| 10,746,190 B2 * | 8/2020 | Chen | ................. | F04D 29/4226 |
| 11,022,136 B2 * | 6/2021 | Chen | ..................... | F04D 29/329 |
| 11,690,196 B2 * | 6/2023 | Qian | ................. | H05K 7/20172 361/679.48 |
| 11,767,857 B2 * | 9/2023 | Amer | .................... | F04D 29/441 415/206 |

(Continued)

FOREIGN PATENT DOCUMENTS

| | | | |
|---|---|---|---|
| CN | 210517962 A | 5/2020 | |
| DE | 102006015808 A1 * | 10/2007 | ......... F04D 29/4226 |

(Continued)

OTHER PUBLICATIONS

Search Report dated Sep. 23, 2022 issued by Taiwan Intellectual Property Office for counterpart application No. 111100266.

*Primary Examiner* — Jonathan P Masinick
(74) *Attorney, Agent, or Firm* — Demian K. Jackson; Jackson IPG PLLC (57) ABSTRACT

A motor case assembly includes a shaft and a motor case. The shaft has a connection end formed with a groove. The motor case has a perforation for assembling and connecting with the shaft. A hub section protrudes a rim of the perforation and has a forced outer face and an inner face surrounding the connection end and the groove of the shaft. An external means is used to apply an external force to the hub section so as to make the hub section tightly hoop the connection end of the shaft. By means of the external force, the inner face of the hub section is partially intruded into the groove of the shaft to form an intrusion body connected with the groove under a top wall inner face of the motor case. Therefore, the motor case and the shaft are securely connected with each other without easy detachment.

4 Claims, 6 Drawing Sheets

(56) References Cited

U.S. PATENT DOCUMENTS

| | | | |
|---|---|---|---|
| 2003/0111930 A1 | 6/2003 | Vacheron | |
| 2005/0207888 A1* | 9/2005 | Kashiwazaki | F04D 29/4226 |
| | | | 415/206 |
| 2006/0024160 A1* | 2/2006 | Horng | F04D 29/4226 |
| | | | 415/206 |
| 2006/0099089 A1* | 5/2006 | Hong | F04D 13/0673 |
| | | | 417/423.1 |
| 2007/0128052 A1* | 6/2007 | Moriya | F04D 29/5806 |
| | | | 417/354 |
| 2009/0060730 A1* | 3/2009 | Hwang | F04D 29/30 |
| | | | 415/203 |
| 2009/0169377 A1* | 7/2009 | Horng | F04D 29/646 |
| | | | 415/213.1 |
| 2014/0178184 A1* | 6/2014 | Chou | H02K 5/1677 |
| | | | 165/80.1 |
| 2017/0107994 A1* | 4/2017 | Kosaka | F04D 29/056 |
| 2020/0191148 A1* | 6/2020 | Shen | F04D 29/043 |
| 2020/0336027 A1 | 10/2020 | Takahashi | |
| 2021/0216120 A1* | 7/2021 | Kitamura | G06F 1/203 |
| 2023/0003230 A1* | 1/2023 | Qian | F04D 29/4226 |

FOREIGN PATENT DOCUMENTS

| | | | | |
|---|---|---|---|---|
| EP | 2474742 A2 * | 7/2012 | | F04D 17/04 |
| TW | 201226706 A | 7/2012 | | |
| TW | 202017276 A | 5/2020 | | |
| TW | M626548 U | 5/2022 | | |

\* cited by examiner (PRIOR ART)
Fig.1

MOTOR CASE ASSEMBLY

BACKGROUND OF THE INVENTION

1. Field of the Invention

The present invention relates generally to a motor case, and more particularly to a motor case assembly connected with a shaft.

2. Description of the Related Art

In the current heat dissipation technique, a heat sink or a vapor chamber or a flat-plate heat pipe or a combination thereof is disposed on an electronic component to dissipate the heat generated by the electronic component by means of heat exchange with the environment. However, the heat exchange effect is limited. Therefore, it is necessary to additionally arrange a cooling fan to forcedly dissipate the heat of the electronic component so as to enhance the heat dissipation effect. A common fan has a hub and a shaft fitted through a bearing corresponding to a stator. When the stator is powered on and magnetized, the fan is driven to operate.

In general, the hub (plastic material) and the shaft (metal) is integrally connected with each other by means of insert injection molding or punching or riveting. However, when the rotational torque generated by the fan in rotation is greater than the external torque between the shaft and the hub, the shaft is apt to detach or loosen from the hub. As a result, the fan will damage and malfunction.

Figure 1:
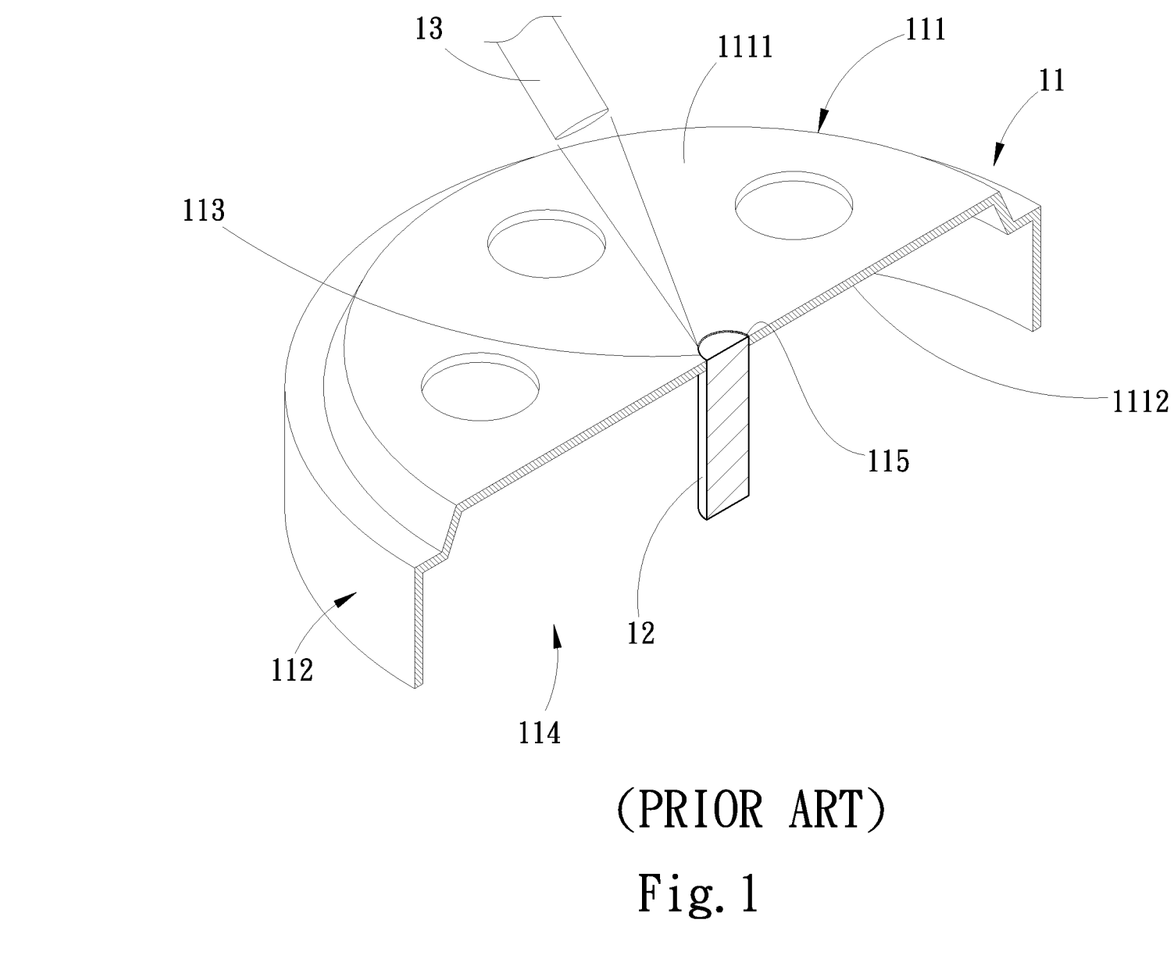
FIG. 1 is a perspective sectional view of a conventional motor case assembly.

FIG. 1 shows a conventional case body 11 (such as a hub or a motor case). The case body 11 is made of metal material (such as iron, copper, aluminum or an alloy thereof). The case body 11 has a top section 11, a circumferential section 112 and a perforation 113. The top section 111 has an outer side 1111 and an inner side 1112 respectively formed on two opposite sides of the top section 111. The perforation 113 is formed through a center of the top section 11. The circumferential section 112 downward extends from a circumference of the top section 111. The top section 111 and the circumferential section 112 together define a receiving space 114 in communication with the perforation 113.

A shaft 12 is inserted in the perforation 113 in contact with the top section 111. The contact sections between an outer circumference of the shaft 12 and the outer side 1111 in adjacency to the perforation 113 are laser welded (or fused) with each other. That is, a laser device 13 is used to generate a laser beam to fuse the outer circumference of the shaft 12 and the outer side 1111 in adjacency to the perforation 113 with each other to form a fusion section 115. In addition, the contact sections between the outer circumference of the shaft 12 and the inner side 1112 in adjacency to the perforation 113 are selectively laser welded (or fused) with each other to form another fusion section. By means of the laser welding, the case body 11 and the shaft 12 are integrally connected to avoid loosening or detachment of the shaft 12.

In the laser welding, a high-energy-density laser is employed as a heat source to project onto the contact sections of the two separate components. After the separate components absorb the laser energy, the components are quickly fused or even evaporated to together form a fusion pool. Thereafter, the components are together cooled and solidified to physically connect with each other. In practice, it often takes place that the laser welding position can be hardly accurately controlled to be within the focusing range of the laser beam. As a result, the laser beam at high temperature often penetrates through the components to damage the same. This leads to low production yield. Also, the welding displacement time can be hardly unified so that different sizes of fusion pools are formed. As a result, after the case body 11 and the shaft 12 are connected to form an assembly, the size precision of the assembly cannot be unified.

It is therefore tried by the applicant to provide a motor case assembly to solve the above problems existing in the conventional technique.

SUMMARY OF THE INVENTION

It is therefore a primary object of the present invention to provide a motor case assembly, in which after the motor case and the shaft are connected to form an assembly, the size of the assembly can keep stable and the production yield is increased.

It is a further object of the present invention to provide the above motor case assembly, which can enhance the connection strength between the motor case and the shaft to avoid detachment of the shaft.

To achieve the above and other objects, the motor case assembly of the present invention includes: a shaft having a connection end, the connection end being formed with a groove and a lower section, the lower section being positioned under the groove; and a motor case including a top wall. The top wall has a top wall outer face and a top wall inner face. The top wall is formed with a perforation for assembling and connecting with the shaft. A hub section downward protrudes from the top wall inner face along a rim of the perforation. The hub section is in communication with the perforation. The hub section has a forced outer face and an inner face. The outer face is perpendicularly connected under the top wall inner face. The connection end of the shaft is inserted in the hub section and the perforation, whereby the groove is positioned under the top wall inner face corresponding to the inner face of the hub section. An external means is used to apply an external force to the outer face of the hub section so as to make the hub section tightly hoop the connection end of the shaft. By means of the external force, the inner face of the hub section is partially intruded into the groove of the shaft to form an intrusion body connected with the groove under the top wall inner face. The inner face further has a lower tight hoop section positioned under the intrusion body for tightly enclosing the lower section of the connection end, whereby the motor case and the shaft are securely connected with each other.

In the above motor case assembly, the motor case has a circumferential wall downward extending from an outer circumference of the top wall. The circumferential wall and the top wall together define a case body space.

In the above motor case assembly, the connection end is solid or hollow and has a top face. The top face is flush with the top wall outer face of the motor case through the perforation.

In the above motor case assembly, the groove is a U-shaped or V-shaped or C-shaped annular groove disposed around an outer surface of the connection end.

In the above motor case assembly, the groove is multiple sinks distributed over an outer surface of the connection end.

In the above motor case assembly, the sinks are respectively in the form of an elongated strip in parallel to each other.

In the above motor case assembly, the sinks are multiple pairs of intersecting elongated strips.

In the above motor case assembly, the sinks respectively have identical or different geometrical configurations.

In the above motor case assembly, a forced section is disposed on the outer face of the hub section.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 2A:
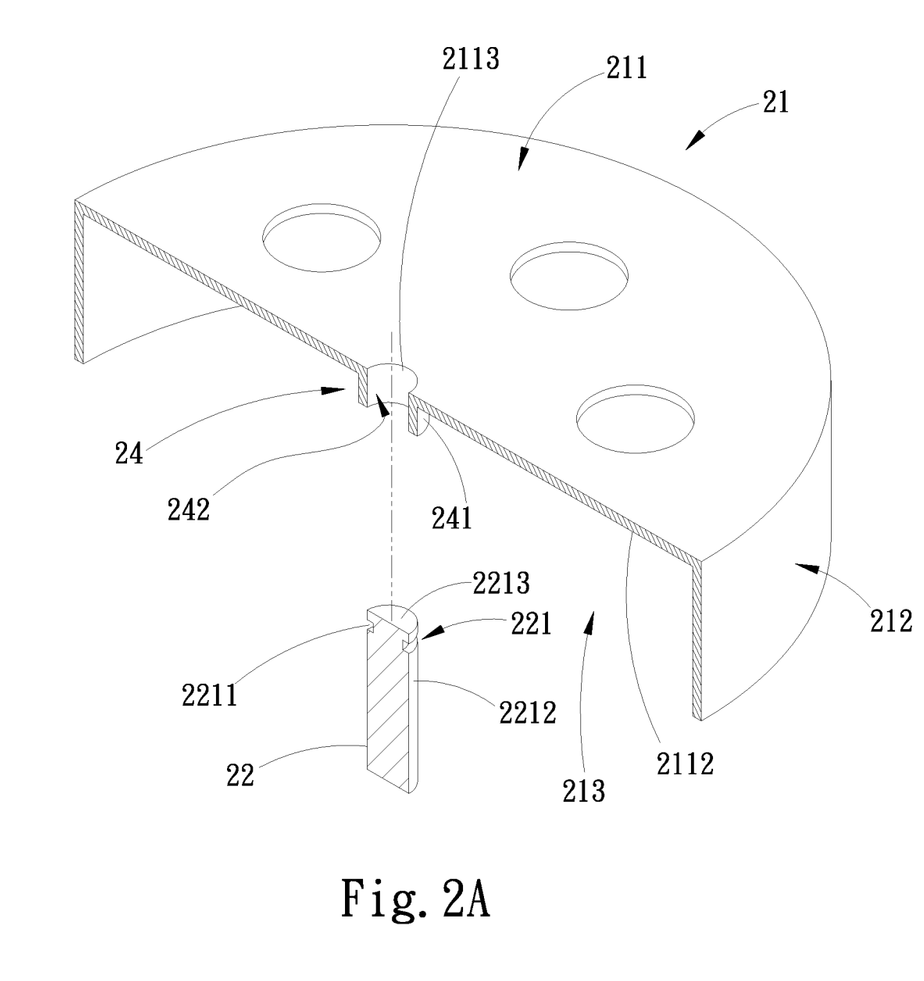
FIG. 2A is a perspective sectional exploded view of the motor case assembly of the present invention.
Figure 2B:
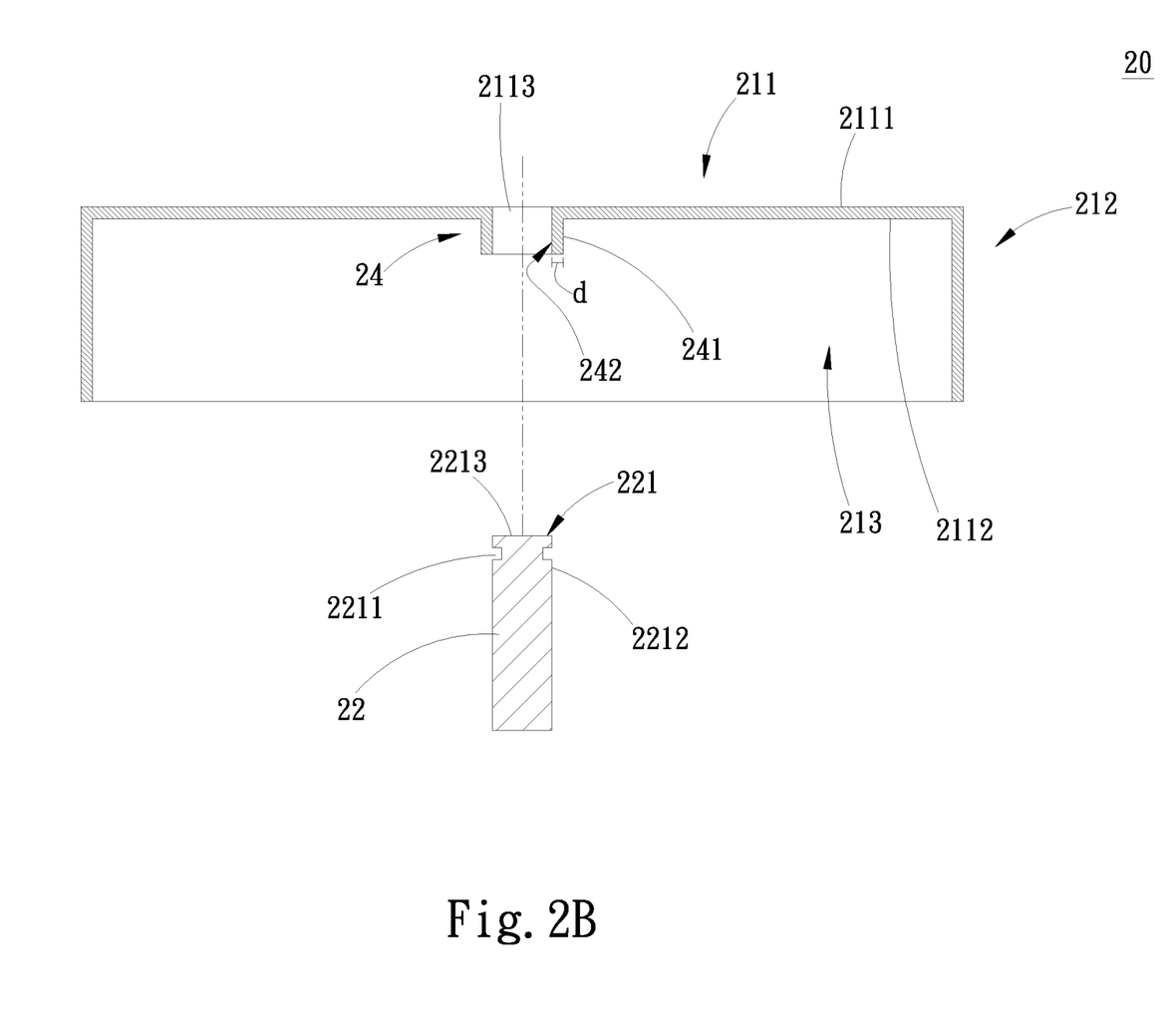
FIG. 2B is a sectional exploded view of the motor case assembly of the present invention.
Figure 2C:
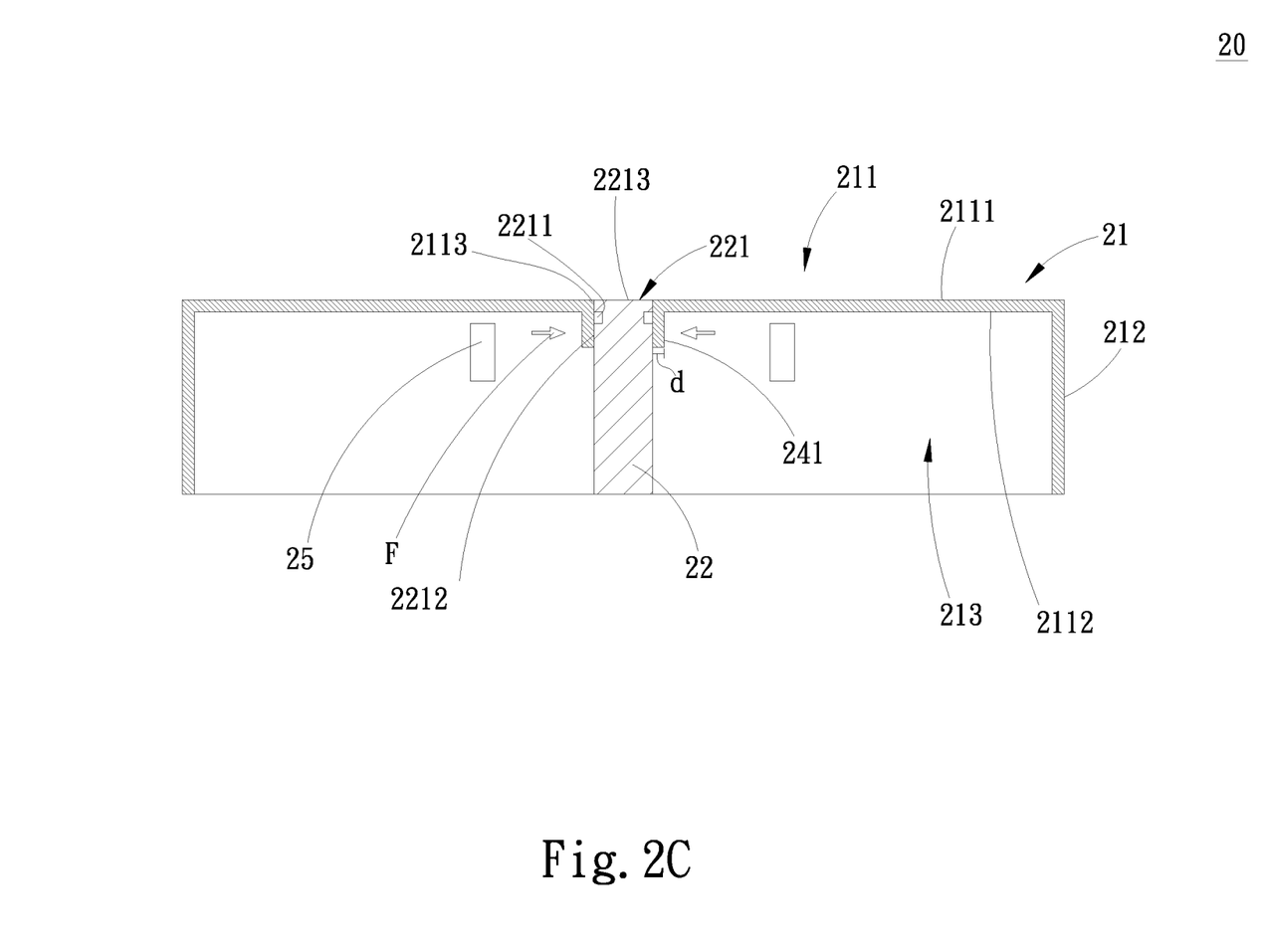
FIGS. 2C-2E are sectional assembled views of the motor case assembly of the present invention.
Figure 2D:
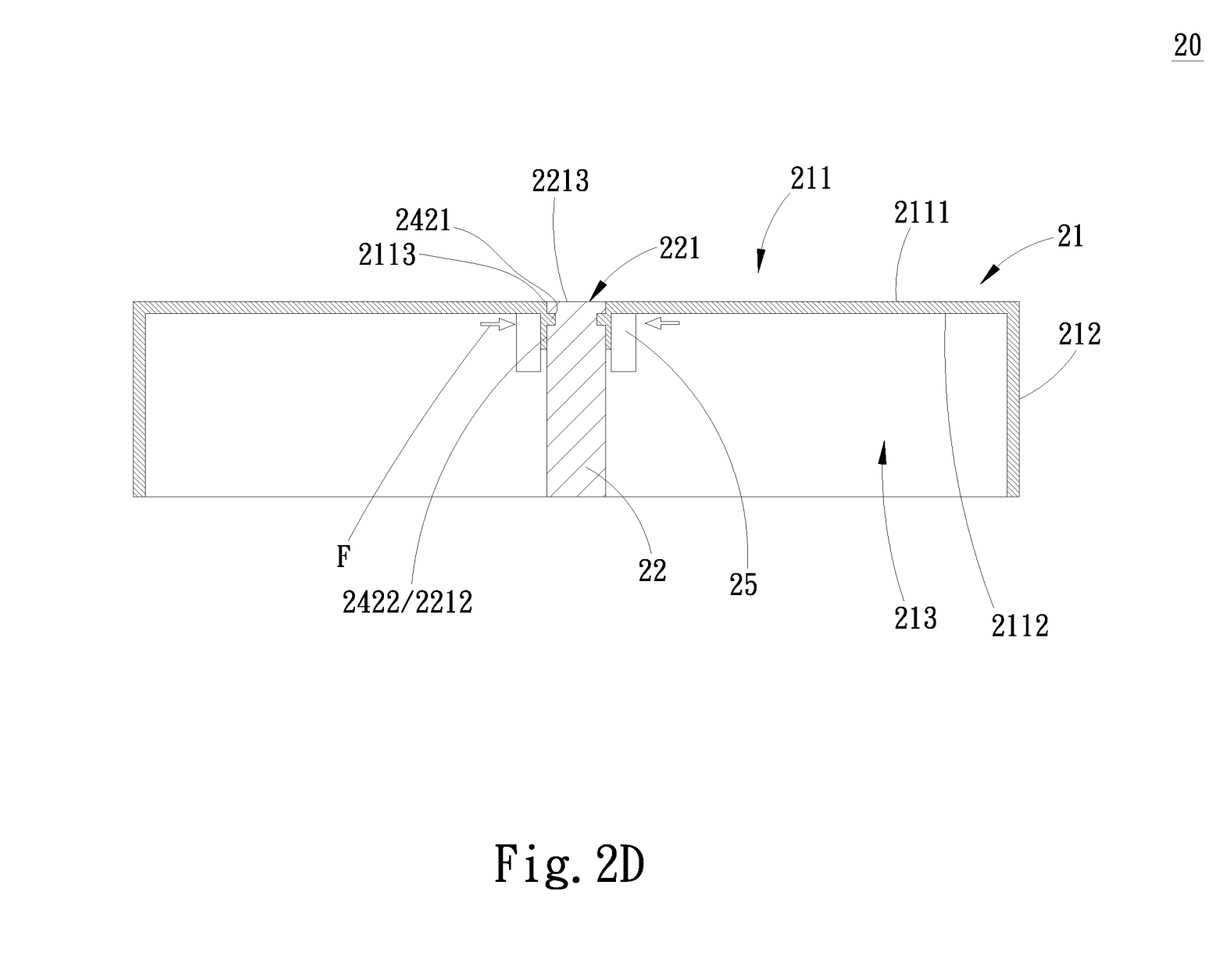
Figure 2E:
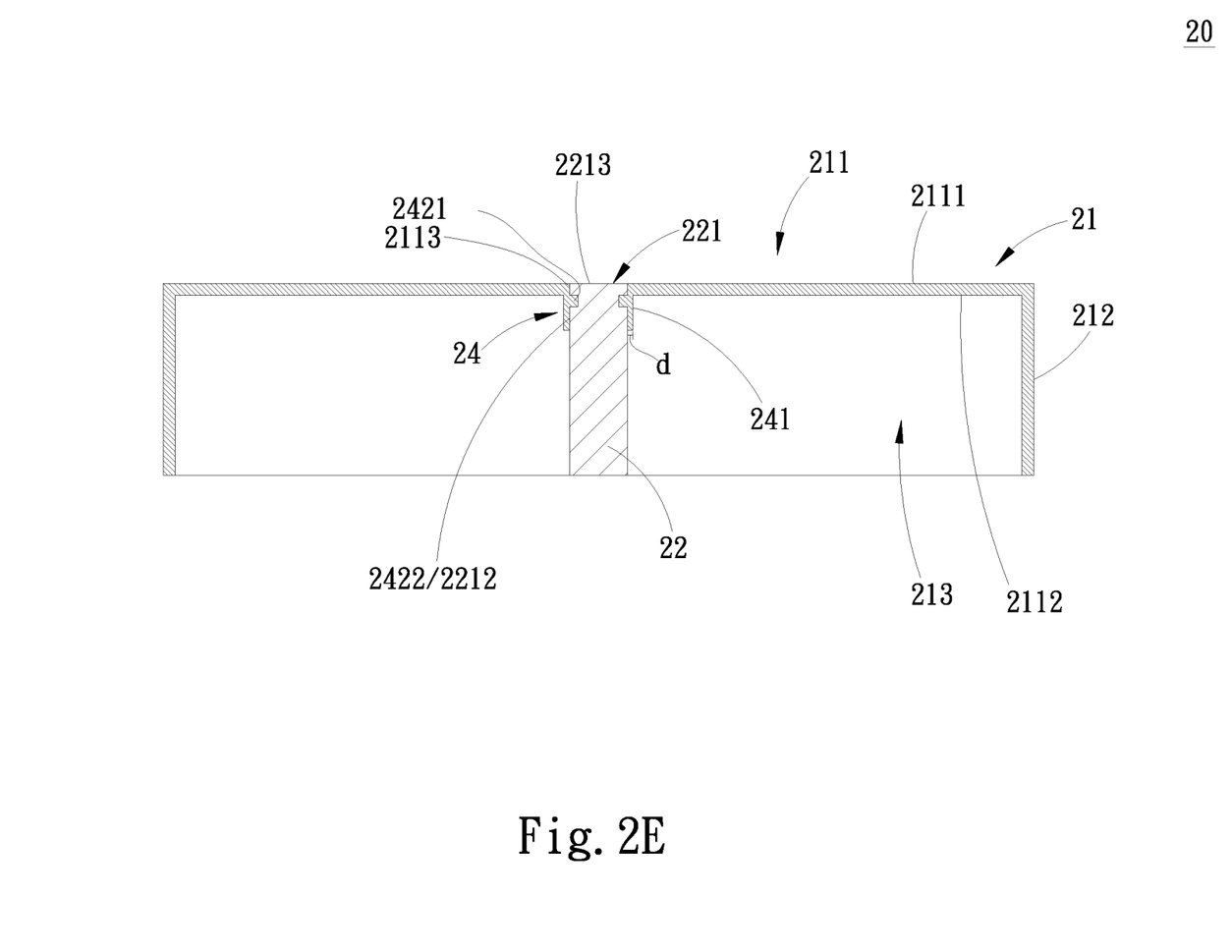

Please refer to FIGS. 2A, 2B, 2C, 2D and 2E. FIG. 2A is a perspective sectional exploded view of the motor case assembly of the present invention. FIG. 2B is a sectional exploded view of the motor case assembly of the present invention. FIGS. 2C-2E are sectional assembled views of the motor case assembly of the present invention. The motor case assembly 20 of the present invention includes a motor case 21 and a shaft 22. The motor case 21 includes a top wall 211 and a circumferential wall 212. The circumferential wall 212 downward extends from an outer circumference of the top wall 211. The top wall 211 and the circumferential wall 212 together define a case body space 213. The top wall 211 has a top wall outer face 2111 and a top wall inner face 2112. In addition, the top wall 211 is formed with a perforation 2113 for assembling and connecting with the shaft 22. The motor case 21 is made of metal material (such as iron, copper and aluminum alloy). A hub section 24 downward protrudes from the top wall inner face 2112 into the case body space 213 along a rim of the perforation 2113. The hub section 24 is in communication with the perforation 2113 and has an outer face 241 and an inner face 242. The outer face 241 is perpendicularly connected under the top wall inner face 2112. In addition, a forced section is disposed on the outer face 241, to which a force can be applied.

The shaft 22 is made of metal material (such as iron and stainless steel). The shaft 22 has a connection end 221 and a free end. The connection end 221 is formed with a groove 2211 and a lower section 2212 positioned under the groove 2211. In this embodiment, the groove 2211 is a U-shaped annular groove formed around an outer surface of the connection end 221. The connection end 221 is inserted into the hub section 24 and flush with the perforation 2113, whereby the groove 2211 is positioned under the top wall inner face 2112 corresponding to the inner face 242 of the hub section 24. In addition, a top face 2213 of the connection end 221 is flush with the top wall outer face 2111 of the motor case 21 through the perforation 2113.

To speak more specifically, an external means 25 (such as a pressure pliers) can be used to apply an external force F (such as pressure) to the outer face 241 of the hub section 24 so as to make the hub section 24 tightly hoop the connection end 221 of the shaft 22. By means of the external force F, the inner face 242 is partially deformed and intruded into the groove 2211 of the shaft 22 to form an intrusion body 2421 connected with the groove 2211 under the top wall inner face 2112. In addition, the inner face 242 has a lower tight hoop section 2422 positioned under the intrusion body 2421 for tightly enclosing the lower section 2212 of the connection end 221. Accordingly, the motor case 21 and the shaft 22 are securely connected with each other without easy detachment. Furthermore, the intrusion body 2421 is formed of a part of the material of the hub section 24 by intrusion. Therefore, a thickness d between the outer face 241 and the inner face 242 of the hub section 24 is thinned.

Alternatively, an external force F can be applied to a part of the forced section of the outer face 241 of the hub section 24, whereby the forced section is such deformed that the outer face 241 is inward recessed, while the inner face 242 protrudes toward the shaft 22 so as to tightly hoop the connection end of the shaft 22. In addition, the lower tight hoop section 2422 encloses the lower section 2212 of the connection end 221 so as to enlarge the connection area between the hub section 24 and the connection end 221 of the shaft 22. This can enhance the connection strength between the motor case 21 and the shaft 22 to avoid detachment of the shaft 22.

In the above embodiment, the groove 2211 of the shaft 22 is, but not limited to, a U-shaped annular groove. Alternatively, the groove 2211 can be a C-shaped annular groove or V-shaped annular groove. In a modified embodiment, the groove 2211 is multiple sinks annularly distributed over an outer surface of the connection end 221. The sinks are such as in the form of an elongated strip in parallel to each other or multiple pairs of intersecting elongated strips or identical or different geometrical configurations. Moreover, in practice, the connection end 221 of the shaft 22 can be selectively solid or hollow in accordance with the magnitude of the external force of the shaft 22 and the motor case 21.

In addition, the motor case assembly 20 is connected with a hub with multiple blades to form a fan impeller. Alternatively, multiple blades are disposed on the circumferential wall 212 of the motor case 21 to form a fan impeller.

By means of the above structure, the connection strength between the motor case 21 and the shaft 22 is enhanced to avoid detachment of the shaft 22 from the motor case 21. Also, after the motor case 21 and the shaft 22 are assembled, the size of the motor case assembly 20 can keep stable and the production yield is increased.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A motor case assembly comprising:
   a shaft having a connection end, the connection end being formed with a groove and a lower section, the lower section being positioned under the groove; and
   a motor case including a top wall, the top wall having a top wall outer face and a top wall inner face, the top wall being formed with a perforation for assembling and connecting with the shaft, a hub section protruding from the top wall inner face along a rim of the perforation, the hub section being in communication with the perforation, the hub section having an outer face and an inner face, the outer face being perpendicularly connected under the top wall inner face, the connection end of the shaft being inserted in the hub section and the perforation, whereby the groove is positioned under the top wall inner face corresponding to the inner face of the hub section, an external means being used to apply an external force to the outer face of the hub section so as to make the hub section tightly hoop the connection end of the shaft, by means of the external force, the inner face being partially intruded into the groove of the shaft to form an intrusion body connected with the groove under the top wall inner face, the inner face further having a lower tight hoop section positioned under the intrusion body for tightly enclosing the lower section of the connection end, whereby the motor case and the shaft are securely connected with each other.

2. The motor case assembly as claimed in claim 1, wherein the motor case has a circumferential wall downward extending from an outer circumference of the top wall, the circumferential wall and the top wall together defining a case body space.

3. The motor case assembly as claimed in claim 1, wherein the connection end is solid and has a top face, the top face being flush with the top wall outer face of the motor case through the perforation.

4. The motor case assembly as claimed in claim 1, wherein the groove is a U-shaped annular groove disposed around an outer surface of the connection end.

* * * * *